United States Patent
Song et al.

(10) Patent No.: US 11,885,990 B2
(45) Date of Patent: Jan. 30, 2024

(54) UV REFLECTIVE MIRRORS FOR DISPLAY FABRICATION

(71) Applicant: MATERION CORPORATION, Mayfield Heights, OH (US)

(72) Inventors: Ki-Sung Song, Mayfield Heights, OH (US); Hunho Lee, Mayfield Heights, OH (US); Edgar E. Vidal, Mayfield Heights, OH (US); Kyung H. Chung, Mayfield Heights, OH (US); Jason R. Clune, Mayfield Heights, OH (US)

(73) Assignee: Materion Corporation, Mayfield Heights, OH (US)

( * ) Notice: Subject to any disclaimer, the term of this patent is extended or adjusted under 35 U.S.C. 154(b) by 308 days.

(21) Appl. No.: 17/272,112

(22) PCT Filed: Aug. 23, 2019

(86) PCT No.: PCT/US2019/047871
§ 371 (c)(1),
(2) Date: Feb. 26, 2021

(87) PCT Pub. No.: WO2020/046739
PCT Pub. Date: Mar. 5, 2020

(65) Prior Publication Data
US 2021/0318472 A1   Oct. 14, 2021

Related U.S. Application Data

(60) Provisional application No. 62/738,210, filed on Sep. 28, 2018, provisional application No. 62/723,102, filed on Aug. 27, 2018.

(51) Int. Cl.
*G02B 5/08* (2006.01)
*C22C 25/00* (2006.01)

(52) U.S. Cl.
CPC ............ *G02B 5/0891* (2013.01); *C22C 25/00* (2013.01)

(58) Field of Classification Search
CPC ........ G02B 5/0891; G02B 5/08; G02B 5/283; G02B 5/26; G02B 5/0808; G02B 5/285;
(Continued)

(56) References Cited

U.S. PATENT DOCUMENTS 4,659,548 A * 4/1987 Gubbay ............... B22F 3/15
419/48
6,310,905 B1 10/2001 Shirai
(Continued)

FOREIGN PATENT DOCUMENTS

CN   1317228 C     5/2007
CN   100999018 A   7/2007
(Continued)

OTHER PUBLICATIONS

Materion (AlbeMet Technical Fact Sheet, date: Jul. 2, 2017, https://web.archive.org/web/20170702155052/https://materion.com/-/media/files/pdfs/beryllium/albemet-materials/maab-032albemettechnicaldatasheet.pdf) (Year: 2017).*
(Continued)

*Primary Examiner* — Stephone B Allen
*Assistant Examiner* — Jyotsna V Dabbi
(74) *Attorney, Agent, or Firm* — COZEN O'CONNOR

(57) ABSTRACT

An apparatus which includes an ultraviolet laser and at least one reflective mirror having a substrate which is made from beryllium, an aluminum metal matrix, or silicon carbide. The at least one mirror is adapted to reflect a laser beam generated from the ultraviolet laser, which can then be used on a silicon film used in the production of an electronic display. The laser beam can be used to anneal the silicon film, or in a laser lift-off process for separating the silicon
(Continued)

film from a temporary substrate upon which the silicon film was mounted.

13 Claims, 9 Drawing Sheets

(58) Field of Classification Search
CPC ...... G02B 5/0284; G02B 5/0858; G02B 1/11; G02B 1/14; G02B 1/115; G02B 1/10; G02B 1/116; G02B 17/0892; G02B 6/0055; G02B 6/0031; G02B 19/0095; C22C 25/00; A61L 2/10; A61L 2/20; A61L 2/0047; A61L 2/24; A61L 2/26; A61L 2202/11; A61L 2202/14; A61L 2202/20; B32B 2307/416; B32B 2307/71; B32B 2307/40; B32B 7/023; B32B 225/205; B32B 2551/00; B32B 2251/08; B32B 2311/00; B32B 2250/02; B32B 2250/03
USPC ........................................................ 359/350
See application file for complete search history.

(56) References Cited

U.S. PATENT DOCUMENTS

| | | |
|---|---|---|
| 2003/0147131 A1 | 8/2003 | Terasawa |
| 2005/0045830 A1 | 3/2005 | Shishido et al. |
| 2015/0124305 A1 * | 5/2015 | Barho ................. G02B 7/1828 359/225.1 |
| 2021/0074876 A1 * | 3/2021 | Kishimoto ........... H10K 50/844 |

FOREIGN PATENT DOCUMENTS

| | | | |
|---|---|---|---|
| CN | 103192082 A | 7/2013 | |
| CN | 108300906 A | 7/2018 | |
| DE | 102013215169 A1 | 2/2015 | |
| DE | 102016217735 A1 | 3/2018 | |
| EP | 0265658 A2 * | 5/1988 | ............... G03F 1/00 |
| JP | 2017083789 A | 5/2017 | |
| JP | 2017530402 A | 10/2017 | |
| TW | 200725699 A | 7/2007 | |
| WO | WO-2008020965 A2 * | 2/2008 | ........... G02B 5/0891 |

OTHER PUBLICATIONS

Stonehouse (Physics and chemistry of Beryllium, Materion published material, Date:Oct. 8, 1985) (Year: 1985).*
International Application No. PCT/US2019/047871, International Search Report dated Mar. 9, 2020, 2 pages.
A. Khounsary et al., Beam Coherence and X-Ray Windows, SPIE, PO Box 10 Bellingham WA 98227-0010 USA, Dec. 31, 2010 , XP040527775 2 section 3.2 vol. 7802 pp. 780200-1-780200-5.

* cited by examiner

UV REFLECTIVE MIRRORS FOR DISPLAY FABRICATION

CROSS-REFERENCE TO RELATED APPLICATIONS

This application claims priority to International Application No. PCT/US2019/047871, published as International Publication No. WO2020/046739, which claims priority to U.S. Provisional Patent Application Ser. No. 62/738,210, filed on Sep. 28, 2018, and to U.S. Provisional Patent Application Ser. No. 62/723,102, filed on Aug. 27, 2018, which are incorporated by reference in their entireties.

BACKGROUND

The present disclosure relates to ultraviolet reflective mirrors used in the fabrication of electronic displays. In particular, the use of different materials as substrates for mirrors used for beam steering of ultraviolet lasers such as an excimer laser are disclosed, and will be described with particular reference thereto.

Excimer laser annealing ("ELA") and laser lift-off ("LLO") processes, performed on amorphous silicon films, have become a common technique used in the manufacturing of panel displays, such as low-temperature polycrystalline silicon LCD ("LTPS LCD") and organic light-emitting diode ("OLED"). These panel displays are used in the manufacturing of various electronic devices such as mobile or cellular phones, computer monitors, televisions, watches, etc. The general increase in demand for such panel displays is pushing manufacturers to increase throughput, increase the size of panel displays, and lower the downtime for maintenance on the production equipment used in the manufacturing of panel displays.

BRIEF DESCRIPTION

The present disclosure relates to apparatuses that include an ultraviolet laser and at least one reflective mirror. The at least one mirror includes a substrate, and is adapted to reflect a laser beam generated from the ultraviolet laser towards a substrate. The mirror substrate can be made from beryllium, silicon carbide, or an aluminum metal matrix composite. The apparatus can be used in the production of an electronic part for a display panel.

Disclosed in various embodiments are apparatuses comprising: an ultraviolet laser; and at least one reflective mirror comprising a substrate, wherein the at least one mirror is adapted to reflect a laser beam generated from the ultraviolet laser. The mirror substrate can be made from beryllium, silicon carbide, or an aluminum metal matrix composite.

When the mirror substrate is made from beryllium, the beryllium substrate can be made of any pure beryllium or alloys of beryllium. In some particular embodiments, the beryllium substrate can be made from a grade of beryllium selected from at least one of: (a) O-50, having a 99.5% minimum Be content and a 0.5% maximum BeO content; (b) S-65, having a 99% minimum Be content and a 1% maximum BeO content; (c) I-70, having a 99% minimum Be content and a 0.7% maximum BeO content; (d) S-200, having a 98.5% minimum Be content and a 1.5% maximum BeO content; (e) I-220 having a 98% minimum Be content and a 2.2% maximum BeO content; and (f) I-250 having a 97.5% minimum Be content and a 2.5% maximum BeO content.

In some embodiments, the beryllium substrate comprises beryllium and at least one alloying element selected from Al, Ti, Co, Ni, Cu, Pd, Au, Nb, Ag, Ta, V, Cr, Mn, Fe, Mo, W, Re, Zr, Hf, Y, La, Ce, Th, U, Np, Pu, Am, Ca, and Mg. The mirror can contain from about 50 wt % to about 99.99 wt % of beryllium and from about 0.01 wt % to about 50 wt % of the at least one alloying element.

In particular embodiments, the mirror substrate is made from an aluminum-beryllium composition that may contain from about 50 wt % to about 99.99 wt. % of beryllium and from about 0.01 wt. % to about 50 wt. % of aluminum.

When the mirror substrate is made from silicon carbide or an aluminum metal matrix, the silicon carbide or aluminum metal matrix composite can have: (i) an optical Figure of Merit (FoM) resonant frequency value of at least 6 relative to a fused-quartz substrate; (ii) an optical FoM self-weight deflection value of less than 0.030 relative to a fused-quartz substrate; (iii) an optical FoM steady-state thermal distortion coefficient value of less than 0.350 relative to a fused-quartz substrate; and (iv) an optical FoM transient thermal distortion coefficient value of less than 0.600 relative to a fused-quartz substrate.

The mirror substrate can be made of an aluminum metal matrix composite of an aluminum alloy and one or more reinforcing materials. The one or more reinforcing materials can include at least one ceramic material selected from the group consisting of carbides, oxides, silicides, borides, and nitrides.

In some other particular embodiments, the one or more reinforcing materials can include silicon carbide. In such embodiments, the metal matrix composite can comprise a 6061, 6063, 6082, 2009, 2618 or 2124 aluminum alloy reinforced with from about 15 vol % to about 40 vol % silicon carbide.

In additional embodiments, the mirror substrate is in the form of an aluminum-beryllium metal matrix composite, wherein the aluminum serves as a matrix phase, and the beryllium is in the form of reinforcing materials/particles. Additional reinforcing materials/particles may also be present in such a metal matrix composite.

The at least one mirror may further comprise an ultraviolet reflective coating deposited upon the mirror substrate. In some embodiments, a base material, such as nickel or a nickel alloy, is deposited on the bare mirror substrate. On top of the base material, a layer or multiple layers of an ultraviolet light reflective material is deposited. This reflective coating may be dielectric, like hafnium oxide ($HfO_2$) and silicon dioxide ($SiO_2$) combinations. An alternative reflective coating may be of the "enhanced-aluminum" type which consists of an aluminum metal binder with alternating coatings of hafnium oxide and silicon dioxide.

The apparatus may further comprise a beam homogenizer, a beam expander, a focusing lens, or a beam splitter, as well as combinations of these components.

Also disclosed are methods of making an electronic part, comprising: receiving an ultraviolet laser apparatus comprising an ultraviolet laser and at least one reflective mirror comprising a substrate; generating a laser beam with the ultraviolet laser; and reflecting the laser beam with the at least one reflective mirror toward a precursor film to produce the electronic part. The mirror substrate can be made from beryllium, silicon carbide, or an aluminum metal matrix composite.

The precursor film may be an amorphous film. The laser beam may be reflected directly upon the precursor film to induce crystallization of the amorphous film (i.e. in an annealing process). Alternatively, the precursor film may be mounted upon a temporary substrate, and the laser beam is reflected through the temporary substrate onto the precursor film to separate the precursor film from the temporary substrate (i.e. in a laser lift-off process). The electronic part may be used in an OLED display or an LTPS LCD display. In some particular embodiments, the precursor film is an amorphous silicon film.

Also disclosed are methods of using a display fabrication apparatus, comprising: reflecting an ultraviolet laser beam with at least one reflective mirror comprising a substrate onto a silicon film to produce an electronic part to be used in a panel display; wherein the display fabrication apparatus comprises an ultraviolet laser and the at least one reflective mirror comprising a substrate. The mirror substrate can be made from beryllium, silicon carbide, or an aluminum metal matrix composite.

Again, the silicon film may be an amorphous silicon film. The laser beam may be reflected directly upon the silicon film to induce crystallization of the silicon film (i.e. in an annealing process). Alternatively, the silicon film may be mounted upon a temporary substrate, and the laser beam is reflected through the temporary substrate onto the silicon film to separate the silicon film from the temporary substrate (i.e. in a laser lift-off process). The electronic part may be used in an OLED display or an LTPS LCD display.

Also disclosed herein are ultraviolet reflective mirrors, comprising: a mirror substrate; and an ultraviolet reflective coating deposited upon a front surface of the mirror substrate. The mirror substrate can be made from beryllium, silicon carbide, or an aluminum metal matrix composite.

A rear surface of the mirror substrate may include ribs for strengthening the mirror.

The present disclosure also relates to methods and processes of making aluminum metal matrix composites (MMCs) for use as substrates in a reflective mirror of the present disclosure. Generally, the manufacture of the MMCs can include any suitable method, such as powder metal production (including, but not limited to, powder metallurgy and high energy mixing processes) and casting (including, but not limited to, infiltration casting). For example, in certain embodiments, the methods and processes disclosed herein can use mixing/blending of metal powders. Suitable techniques for this mixing include ball milling, mechanical attritors, teamer mills, rotary mills, granulators, as well as other methods that can provide high energy mixing to the powder constituents (e.g., metal powders, reinforcement particles). Alternatively, the MMCs for the substrates can be made through a casting process, such as infiltration casting. Such methods and processes allow control over the interface condition for subsequent mechanical performance or process requirements. As a result, the methods and processes of the present disclosure provide for a cost-effective manufacturing technique capable of producing multiple substrates at a time.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
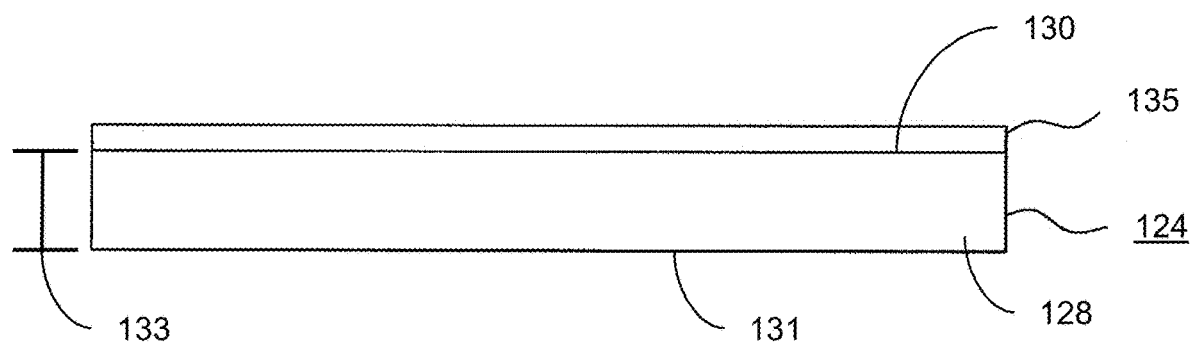
FIG. 1 is a cross-sectional diagram of an ultraviolet-reflective mirror which is used in the formation of electronic displays according to embodiments of the present disclosure. The mirror includes a mirror substrate and an ultraviolet-reflective coating.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing compositions or processes as "consisting of" and "consisting essentially of" the enumerated components/steps, which allows the presence of only the named components/steps, along with any impurities that might result therefrom, and excludes other components/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

The term "ultraviolet" as used herein refers to light having a wavelength of 10 nanometers (nm) to 400 nm.

Ultra-violet (UV) lasers, such as excimer lasers, are commonly utilized in processes and equipment for the production of electronic and microelectronic devices. These devices include but are not limited to mobile or cellular phones, computer monitors, televisions, watches, etc. Various optical components are used in UV lasers in order to achieve desired characteristics such as output wavelengths, beam steering, etc. UV lasers such as excimer lasers rely on coated or uncoated optical components designed for use at specific excimer laser output wavelengths, the most common of which include 157 nm (F2), 193 nm (ArF), 248 nm (KrF), 308 nm (XeCl) and 353 nm (XeF). Exemplary UV optical components include beam turning or steering mirrors, laser cavity optics, beamsplitters, lenses, windows and other components.

Two exemplary processes which use UV lasers in the production of electronic devices include excimer laser annealing ("ELA") and laser lift-off ("LLO"). In ELA, an excimer laser is used to produce a polysilicon film for thin film transistors ("TFTs") and capacitors which are used in electronic displays such as LTPS LCD and/or OLED panels, for example. Generally, an amorphous silicon film is polycrystallized by scanning and irradiating an exposed surface of the amorphous silicon film with an excimer laser beam, i.e. by a thermal treatment process. Among polycrystallization methods, ELA is widely used because this method enables polycrystallization at a relatively low temperature, and allows the formation of a polysilicon film with excellent characteristics including relatively high electron mobility.

LLO processing generally refers to a method that separates a material from a substrate by irradiating the material-substrate interface with an excimer laser. For example, in the manufacture of functional display films, first a thin polymer film is deposited on a temporary glass carrier substrate. A circuit backplane (i.e., a matrix of TFTs) is built on top of the polymer layer, followed by the display frontplane which contains layers for electrodes and microcapsules. Then, during LLO processing, an excimer laser is irradiated through the carrier glass substrate onto the polymer-substrate interface. This evaporates only the polymer in direct contact with the glass substrate. The polymer film delaminates from the rigid glass substrate to form a thin, lightweight, and rugged functional display.

For both ELA and LLO processing, one or more reflective components, such as mirrors, can be used to change the path of the excimer laser beam as desired. For example, the laser beam can be split or steered as needed. Beam steering is often required in ELA processing to ensure that the laser beam irradiates the exposed surface of the amorphous silicon film.

Previous mirrors used in excimer lasers have used quartz as the substrate material, upon which a UV reflective coating is applied. However, quartz has low stiffness and low thermal conductivity, which tends to hinder rapid temperature equalization throughout the substrate. Without the ability to equalize temperature efficiently, mirrors made from quartz are subject to an increased likelihood of mirror distortion occurring as a result of thermal gradients generated from irradiation of the excimer laser on the mirror.

Beryllium is a metal with highly desirable properties for application in reflective components such as mirrors. These include high stiffness (Young's modulus=303 GPa), low density (1.85 g/cc), a high elastic modulus (130 GPa), high specific heat (1925 J/kg·K), high thermal conductivity (216 W/m·K), a low coefficient of linear thermal expansion ($11.4 \times 10^{6}$/° K), and an advantageous thermal diffusivity (0.21 mz/h). In contrast, quartz has a lower stiffness (Young's modulus=74.5 GPa), a higher density (2.2 g/cc), a lower specific heat (741 J/kg·K), and a lower thermal conductivity (1.36 W/m·K). These properties make beryllium potentially a better substrate material than quartz by reducing the reflective coating's optical distortions due to thermal degradation.

Beryllium's higher specific heat means that for any given weight and temperature change, beryllium is able to absorb more heat compared to quartz. On an equal weight basis, beryllium has the highest thermal conductivity among all metals, and its coefficient of thermal expansion closely matches those of stainless steel, titanium, nickel alloys, cobalt alloys, and other common structural materials. This combination of thermal properties gives beryllium a better stability in mirrors over a temperature range of about as low as −250° C. to about as high as 275° C. The thermal diffusivity of beryllium assures rapid temperature equalization, which tends to eliminate or greatly reduce distortion which might otherwise occur as a result of thermal gradients.

In particular embodiments, the mirror substrate is made from an aluminum-beryllium composition has the advantages of both beryllium and aluminum. Aluminum-beryllium compositions exhibit a high modulus-to-density ratio, four times that of aluminum or steel. The thermal conductivity of an aluminum-beryllium composition can be as high as approximately 210 W/mK (watts per meter-kelvin), which exceed by about 25% that of common aluminum metal material composites such as Al 6061.

Equipment used in the steering of the ultraviolet ("UV") laser during these manufacturing processes typically contains a series of prisms and mirrors that ensure the coverage of the whole amorphous silicon surface. The present disclosure relates to mirrors for use in reflecting UV laser light. The mirrors comprise a beryllium substrate and an ultraviolet reflective coating. These mirrors can be used in UV excimer laser annealing and laser lift-off processes, and desirably have improved thermal stress and increased stiffness, such that laser processing speeds can be increased and the downtime between maintenance cycles can be reduced.

Referring to FIG. 1, an exemplary beryllium based mirror 124 is shown. The mirror includes a substrate 128 having a front surface 130 and a rear surface 131. An ultraviolet reflective layer 135 is present on the front surface 130. The mirror substrate can be made from beryllium, silicon carbide, or an aluminum metal matrix.

Generally, in embodiments where the mirror substrate is made from beryllium, the beryllium mirror substrate can be made of any pure beryllium or alloys of beryllium. Beryllium is available in several grades suitable for the substrate 128. These optical grades include O-50 (99.5% minimum Be content, 0.5% maximum BeO content); S-65 (99% minimum Be content, 1% maximum BeO content); I-70 (99% minimum Be content, 0.7% maximum BeO content); S-200 (98.5% minimum Be content, 1.5% maximum BeO content); I-220 (98% minimum Be content, 2.2% maximum BeO content); and I-250 (97.5% minimum Be content, 2.5% maximum BeO content).

Virtually all beryllium substrates are a powder metallurgy-derived product. Beryllium powder is prepared by chipping previously cast ingots and mechanically grinding the chips to the appropriate particle size distribution for consolidation into essentially full density billets by powder metallurgy techniques. The mechanical grinding systems used to manufacture beryllium powder of a given particle size distribution has an effect upon the characteristics of the fully dense body prepared with the powder. This is most notable in the level of minimum tensile elongation which can be generated in any direction at room temperature.

The beryllium powder from which substrate 128 is made may have a particle size of less than 1 micron. In other embodiments, the beryllium-containing powder may have a particle size of less than 200 microns. In particular embodiments, the beryllium-containing powder may have a particle size of from about 10 nanometers to about 200 microns, including from about 5 to 40 microns. The particle size is the $D_{50}$, or the diameter at which a cumulative percentage of 50% of the particles by volume is attained. Put another way, 50% of a given volume of particles has a lower diameter and 50% of the particles have a greater diameter.

In some embodiments, the base of the reaction mixture used to form the beryllium substrate 128 is substantially comprised of only beryllium powder. In other embodiments, the reaction mixture further includes at least one alloying element that is not beryllium. Non-limiting examples of alloying elements include Ti, Co, Ni, Cu, Pd, Au, Nb, Ag, Ta, V, Cr, Mn, Fe, Mo, W, Re, Zr, Hf, Y, La, Ce, Th, U, Np, Pu, Am, Ca, and Mg. In particular embodiments, the alloying element is selected from the group consisting of titanium, zirconium, niobium, tantalum, hafnium and molybdenum.

In some embodiments, the reaction mixture may contain from 50 to 99.99 wt % of the beryllium powder and from 0.01 to 50 wt % of the at least one alloying element. It is contemplated that the alloying element reacts with the beryllium powder.

In other embodiments, the mirror substrate is made of an aluminum metal matrix composite (MMC). The use of a MMC for the mirror substrate can be advantageous because the modulus and coefficient of thermal expansion of the MMC can improve the optical Figures of Merit (FoM) values of the substrate (i.e., values used to characterize the performance of a substrate relative to alternative substrates).

The MMCs of the present disclosure are composite materials including a metal matrix and reinforcement particles dispersed in the metal matrix. The metal matrix phase is typically continuous, whereas the reinforcing particles typically form a dispersed phase within the metal matrix phase. When the mirror substrate 128 is desired to be a MMC, appropriate reinforcement particles can be added to the remaining volume along with the metal powder, with the MMC being formed by the compaction. In particular embodiments, the compacting can be performed by hot isostatic pressing (HIP). The metal powder and reinforcement particles should be mixed together with a high energy technique to distribute the reinforcement particles throughout the resulting metal matrix. Suitable techniques for this mixing include ball milling, mechanical attritors, teamer mills, rotary mills, granulators, and other methods to provide high energy mixing to the powder constituents. Mechanical alloying should be completed in an inert atmosphere to avoid excessive oxidation of powders, for example using nitrogen or argon gas. The processing parameters should be selected to achieve an even distribution of the reinforcement particles in the metallic matrix. The powder from the high energy mixing stage is degassed to remove any retained moisture from the powder surface, this may be completed at between 120° C. to 500° C.

Generally, the manufacture of the MMCs can include any suitable method, such as powder metal production (including, but not limited to, powder metallurgy and high energy mixing processes discussed above) and casting (including, but not limited to, infiltration casting).

One suitable infiltration casting process is liquid metal infiltration. Liquid metal infiltration generally refers to a process where raw metal material(s) are melted at a requisite temperature, poured or injected into a porous preform, and allowed to solidify within and around the preform. This process can be considered a pressure-less infiltration casting method.

Other non-limiting examples of suitable infiltration casting techniques for making the MMC substrates described herein include squeeze casting, pressure casting, die casting, gravity casting, and the like. For example, an exemplary squeeze casting technique can be used to form the MMC substrates of the present disclosure. Squeeze casting is generally based on pressurized solidification. In the squeeze casting process, a solid blank can be first preheated to a desired temperature and placed in a die, or, alternatively, the solid blank can be preheated within the die. Next, molten raw metal material(s) (e.g., aluminum, aluminum alloys, and MMCs) are poured into the die containing the solid blank. The die is located on the bed of a hydraulic press. The press advances to close off the die cavity and pressurize the liquid metal. Pressure is maintained until solidification of the substrate is complete. The press can then be opened and the substrate can be ejected. Squeeze casting, through the high pressures employed during solidification, results in the formation of a pore-free, high-integrity near net shape casting with smooth surfaces and excellent microstructure.

The metal powder can, in certain embodiments, include aluminum or an aluminum alloy in the metal matrix. The aluminum alloy may include at least one element selected from chromium, copper, lithium, magnesium, nickel, and silicon. It is noted that "aluminum," as used herein, refers to aluminum with only impurities present, i.e. pure aluminum, whereas the term "aluminum alloy" as used herein refers to alloys of aluminum with a significant amount of another element.

The aluminum alloy used in the aluminum metal matrix composite may be any 2xxx series aluminum alloy having copper as the primary alloying element, any 5xxx serious aluminum alloy having magnesium as the primary alloying element, any 6xxx series aluminum alloy having magnesium and silicon as the primary alloying elements, any 7xxx serious aluminum alloy having zinc as the primary alloying element, or any 8xxx series aluminum alloy having other elements as the primary alloying element (e.g., iron and silicon). Specific aluminum alloys contemplated for use in the present disclosure include 2009, 2124, 2618, 6061, 6063, and 6082 aluminum alloys, which have the compositions listed below (in wt % for each element):

| Component | 2009 (Wt %) | 2124 (Wt %) | 2618 (Wt %) | 6061 (Wt %) | 6063 (Wt %) | 6082 (Wt %) |
|---|---|---|---|---|---|---|
| Aluminum | 92.8-95.8 | 91.2-94.7 | 92.5-94.9 | 95.8-98.6 | 97.5-99.3 | 95.2-98.3 |
| Chromium | — | 0.1 max | — | 0.04-0.35 | 0.10 max | 0.25 max |
| Copper | 3.2-4.4 | 3.8-4.9 | 1.9-2.7 | 0.15-0.4 | 0.10 max | 0.10 max |
| Iron | 0.05 max | 0.3 max | 0.9-1.3 | 0.7 max | 0.35 max | 0.50 max |
| Magnesium | 1.0-1.6 | 1.2-1.8 | 1.3-1.8 | 0.8-1.2 | 0.45-0.9 | 0.60-1.2 |
| Manganese | — | 0.3-0.9 | — | 0.15 max | 0.10 max | 0.40-1.0 |
| Nickel | — | — | 0.9-1.2 | — | — | — |
| Other, each | 0.05 max | 0.05 max | 0.05 max | 0.05 max | 0.05 max | 0.05 max |
| Other, total | 0.15 max | 0.15 max | 0.15 max | 0.15 max | 0.15 max | 0.15 max |
| Oxygen | 0.60 max | — | — | — | — | — |
| Silicon | 0.25 max | 0.2 max | 0.25 max | 0.4-0.8 | 0.2-0.6 | 0.70-1.3 |
| Titanium | — | 0.15 max | 0.04-0.1 | 0.15 max | 0.10 max | 0.10 max |
| Zinc | 0.10 max | 0.25 max | — | 0.25 max | 0.10 max | 0.20 max |

The reinforcement particles can, in certain embodiments, include at least one ceramic material selected from carbides, oxides, silicides, borides, and nitrides. Specific reinforcement particles include silicon carbide, titanium carbide, boron carbide, silicon nitride, titanium nitride, zirconium oxide, aluminum oxide, aluminum nitride, and titanium oxide. The reinforcement particles may have an average particle size (D50) in the range of from 0.1 micrometers (μm) to 0.5 μm, including about 0.3 μm. The average particle size is defined as the particle diameter at which a cumulative percentage of 50% (by volume) of the total volume of particles are attained. In other words, 50 vol % of the particles have a diameter above the average particle size, and 50 vol % of the particles have a diameter below the average particle size.

In additional embodiments, the aluminum metal matrix composite also contains beryllium. In this particular case, beryllium has a much higher melting point than aluminum, and so the beryllium can be considered to be reinforcing particles within a metal matrix formed by the aluminum. Other reinforcement particles, such as those described above, can also be present in this aluminum-beryllium metal matrix composite.

In particular embodiments, the MMC is a 6061, 6063, 6082, 2009, 2618 or 2124 aluminum alloy reinforced with from about 15 vol % to about 40 vol % of silicon carbide. Other reinforcement particles may also be used instead of silicon carbide.

In more particular embodiments, the MMC can be made from 6061 aluminum alloy reinforced with 40 vol % silicon carbide particles. A 6061 aluminum alloy reinforced with 40 vol % silicon carbide particles is commercially available from Materion under the trade name SupremEX 640. Physical properties of 6061 aluminum alloy reinforced with 40 vol % silicon carbide particles include:

| Physical Properties | |
|---|---|
| Density, g/cm$^3$ (lbs/in$^3$) | 2.9 (0.105) |
| Elastic Modulus, GPa (msi) | 140 (20.3) |
| Specific Stiffness, GPa/g/cm$^3$ | 48 |
| Poisson's Ratio | 0.3 |
| Thermal Conductivity @ 25° C. W/m° K. (BTU/hr.ft. ° F.) | 130 (75) |
| Thermal Expansion @ 25° C. ppm/° C. (ppm/° F.) | 13 (7.4) |
| Solidus ° C. (° F.) | 570 (1058) |
| Specific Heat Capacity J/g/° C. (BTU/lb/° F.) | 0.800 (0.191) |

In other particular embodiments, the MMC can be made from 6061 aluminum alloy reinforced with 20 vol % silicon carbide particles. Physical properties of 6061 aluminum alloy reinforced with 20 vol % silicon carbide particles include:

| Physical Properties | |
|---|---|
| Density, g/cm$^3$ (lbs/in$^3$) | 2.8 (0.101) |
| Elastic Modulus, GPa (msi) | 103 (14.9) |
| Specific Stiffness, GPa/g/cm$^3$ | 36 |
| Poisson's Ratio | 0.3 |
| Thermal Conductivity @ 25° C. W/m° K. (BTU/hr.ft. ° F.) | 150 (87) |
| Thermal Expansion @ 25° C. ppm/° C. (ppm/° F.) | 17 (9.4) |
| Solidus ° C. (° F.) | 570 (1058) |
| Specific Heat Capacity J/g/° C. (BTU/lb/° F.) | 0.850 (0.203) |

In additional particular embodiments, the MMC can be made from 2124 aluminum alloy reinforced with 25 vol % silicon carbide particles. A 2124 aluminum alloy reinforced with 25 vol % silicon carbide particles is commercially available from Materion under the trade name SupremEX 225. Physical properties of 2124 aluminum alloy reinforced with 25 vol % silicon carbide particles include:

| Physical Properties | |
|---|---|
| Density, g/cm$^3$ (lbs/in$^3$) | 2.88 (0.104) |
| Elastic Modulus, GPa (msi) | 115 (16.7) |
| Specific Stiffness, GPa/g/cm$^3$ | 39 |
| Poisson's Ratio | 0.3 |
| Thermal Conductivity @ 25° C. W/m° K. (BTU/hr.ft. ° F.) | 150 (87) |
| Thermal Expansion @ 25° C. ppm/° C. (ppm/° F.) | 16.1 (8.9) |
| Solidus ° C. (° F.) | 548 (1018) |
| Specific Heat Capacity J/g/° C. (BTU/lb/° F.) | 0.836 (0.200) |

In particular embodiments, the MMC can be made from 2124 aluminum alloy reinforced with 17 vol % silicon carbide particles. A 2124 aluminum alloy reinforced with 17 vol % silicon carbide particles is commercially available from Materion under the trade name SupremEX 217XG. Physical properties of 2124 aluminum alloy reinforced with 17 vol % silicon carbide particles include:

| Physical Properties | |
| --- | --- |
| Density, g/cm³ (lbs/in³) | 2.85 (0.103) |
| Elastic Modulus, GPa (msi) | 100 (14.53) |
| Specific Stiffness, GPa/g/cm³ | 35 |
| Poisson's Ratio | 0.3 |
| Thermal Conductivity @ 25° C. W/m° K. (BTU/hr.ft. ° F.) | 155 (90) |
| Thermal Expansion @ 25° C. ppm/° C. (ppm/° F.) | 16.8 (9.3) |
| Solidus ° C. (° F.) | 548 (1018) |
| Specific Heat Capacity J/g/° C. (BTU/lb/° F.) | 0.848 (0.203) |

In other embodiments, the MMC can be made from 6063, 6082, 2009, or 2618 series aluminum alloys reinforced with about 10 vol % to about wt vol % of silicon carbide particles, including from about 15 vol % to about 30 vol %, or from about 20 vol % to about 25 vol % of silicon carbide particles.

In some particular embodiments, the MMC is made of 2009 series aluminum alloy reinforced with 15 vol % silicon carbide particles. Physical properties of 2009 series aluminum alloy reinforced with 15 vol % silicon carbide particles include:

| Physical Properties | |
| --- | --- |
| Density, g/cm³ (lbs/in³) | 2.86 (0.103) |
| Elastic Modulus, GPa (msi) | 96 (13.9) |
| Specific Stiffness, GPa/g/cm³ | 33 |
| Poisson's Ratio | 0.3 |
| Thermal Conductivity @ 25° C. W/m° K. (BTU/hr.ft. ° F.) | 155 (90) |
| Thermal Expansion @ 25° C. ppm/° C. (ppm/° F.) | 18 (10.0) |
| Solidus ° C. (° F.) | 548 (1018) |
| Specific Heat Capacity J/g/° C. (BTU/lb/° F.) | 0.848 (0.203) |

In yet other embodiments, the mirror substrate can be made of 100% silicon carbide (not in particle form), also known as carborundum. Such a substrate can be made by sintering SiC particles together, or other means known in the art.

In still other embodiments, the mirror substrate is made of an aluminum-beryllium composition. Aluminum-beryllium compositions combine the high modulus and low-density characteristics of beryllium with the fabrication and mechanical property behavior of aluminum. Aluminum-beryllium compositions offer excellent specific stiffness and processing characteristics. Aluminum beryllium metal matrix composites do not display sensitivity to machining damage and do not require etching after machining like beryllium. Beryllium, when alloyed with aluminum to form a metal matrix composite, produces a combination of high specific modulus of elastic, low density and high heat capacity in comparison to common structural materials.

The aluminum-beryllium composition may contain from about 50 wt % to 99.99 wt % of beryllium and from 0.01 to about 50 wt % of aluminum. In some embodiments, the aluminum-beryllium composition contains at least 60 wt % of beryllium and at least 30 wt % of aluminum. The ratio of beryllium and aluminum can be varied to alter the physical, thermal and mechanical properties of the aluminum beryllium composition. The resulting alloy is a mixture of aluminum and beryllium which retains the characteristics of a metal, and in the present case includes a mixture of metallic phases (due to the large difference in melting points between aluminum and beryllium).

One example of an aluminum-beryllium composition is made with about 62 wt % beryllium and about 38 wt % aluminum, which is in the form of a metal matrix composite. Such a combination is commercially available from Materion under the trade name AlBeMet® 162. Physical properties of AlBeMet® 162 include:

| Physical Properties | |
| --- | --- |
| Density, g/cm³ (lbs/in³) | 2.1 (0.076) |
| Elastic Modulus, GPa (msi) | 193 (28) |
| Poisson's Ratio | 0.17 |
| Thermal Conductivity @ 25° C. W/m° K. (BTU/hr.ft. ° F.) | 210 (121) |
| Thermal Expansion @ 25° C. ppm/° C. (ppm/° F.) | 13.91 (7.73) |
| Specific Heat J/g/° C. (BTU/lb/° F.) | 1465 (0.35) |

Figure 2:
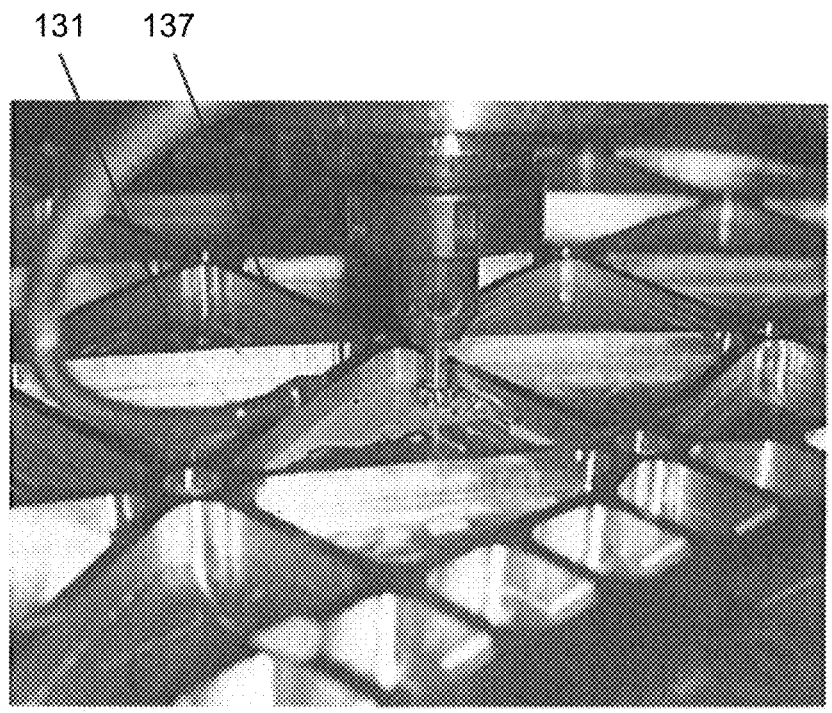
FIG. 2 is an illustration showing the machining of ribs on the back of the mirror substrate.

FIG. 2 is an illustration showing the rear surface of the mirror substrate. In this regard, the mirror substrate is typically formed as a solid blank having the overall desired shape of the mirror. Referring back to FIG. 1, the blank has a front surface 130 and a rear surface 131, with a thickness 133 between the two surfaces. The blank can be machined with a variety of cutting tools to form an open-backed mirror with a smooth front surface and ribs 137 supporting the front surface, as illustrated in FIG. 2.

The mirror substrate blank can be produced by hot isostatic pressing ("HIP") of the powders discussed above, followed by machining to obtain the desired shape of the mirror substrate. In HIP, the metal powders are poured into a metal can or container having an appropriate or desired shape. The container is evacuated by outgassing at temperatures above about 670° C., after which the outgas tubes are sealed off. The container is then placed into an HIP autoclave unit, which is pressurized with a gas (e.g., argon) to as high as about 15 ksi and heated to temperatures of up to about 1250° C. The mirror blanks can be formed to nearly 100% density due to the HIP press' ability to consolidate powders in the sealed, vacuum-degassed container. The container is then removed from the HIP autoclave and additional annealing steps can be performed. The resulting blank has the same shape as the container.

The HIP process advantageously produces solid blanks that are free of voids. Additionally, because HIP applies pressure in all directions, the non-directionality of the final product is maintained better than uniaxial vacuum hot pressing. HIP can generally be used to produce mirror substrate blanks having a relatively simple shape.

The mirror substrate blanks can also be produced by Cold Isostatic Pressing. In some embodiments the material is produced by a gas atomization process, which yields a spherical powder with a fine structure. Three consolidation processes densify the powder each resulting in different mechanical properties. In some embodiments, an extruded bar is fabricated by Cold Isostatic Pressing (CIP), of the isotropic spherical aluminum-beryllium into semi-dense billets and then canning the billet for subsequent extrusion.

The mirror substrate blanks can also be produced by a near-net-shaping (NNS) process followed by machining of the NNS blank. The NNS process can involve a combination of hot and cold isostatic pressing (HIP and CIP) and vacuum sintering methods. In the CIP process, near-net-shape blanks are made from metal powders using flexible polymer bags which are molded to produce the desired blank shape. The CIP process is useful for parts with a more complex geometry. The CIP process is followed by vacuum sintering, and where near 100% density is required, HIP is performed. Because sintering seals surface-connected pores, no container is required for the HIP process. If required, the blank may be hot-formed to the final desired shape.

The transformation of mirror substrate blanks, whether produced by HIP or NNS, into a final ultraviolet reflective mirror 124, generally entails three basic steps of machining the mirror substrate 128, polishing a front surface 130 of the mirror substrate, and coating the front surface with an ultraviolet reflective material 135.

Any machining operations using cutting tool materials should be performed without stressing the work piece (i.e., mirror substrate 128). Accordingly, in some embodiments, low-stress machining techniques that utilize gas bearings in the machine tools are used to achieve high levels of machining accuracy. Using these low-stress machining techniques, the mirror substrate surface 130 can be finished to a surface roughness of as low as about 15 angstroms (Å) (root-mean-square (rms)).

The ultraviolet reflective layer 135 is then applied or formed on the front surface 130 of the mirror substrate 128. In some embodiments, a base material made of a metal, such as nickel or a nickel alloy, is deposited on the bare mirror substrate. On top of this base layer, a layer or multiple layers of an ultraviolet light reflective material is deposited. This reflective coating may be dielectric, such as a layer formed from a combination of hafnium oxide ($HfO_2$) and silicon dioxide. An alternative reflective coating may be of the "enhanced-aluminum" type, in which alternating layers of (i) aluminum metal binder and hafnium oxide and (ii) aluminum metal binder and silicon dioxide, are applied to the mirror substrate.

Figure 3:
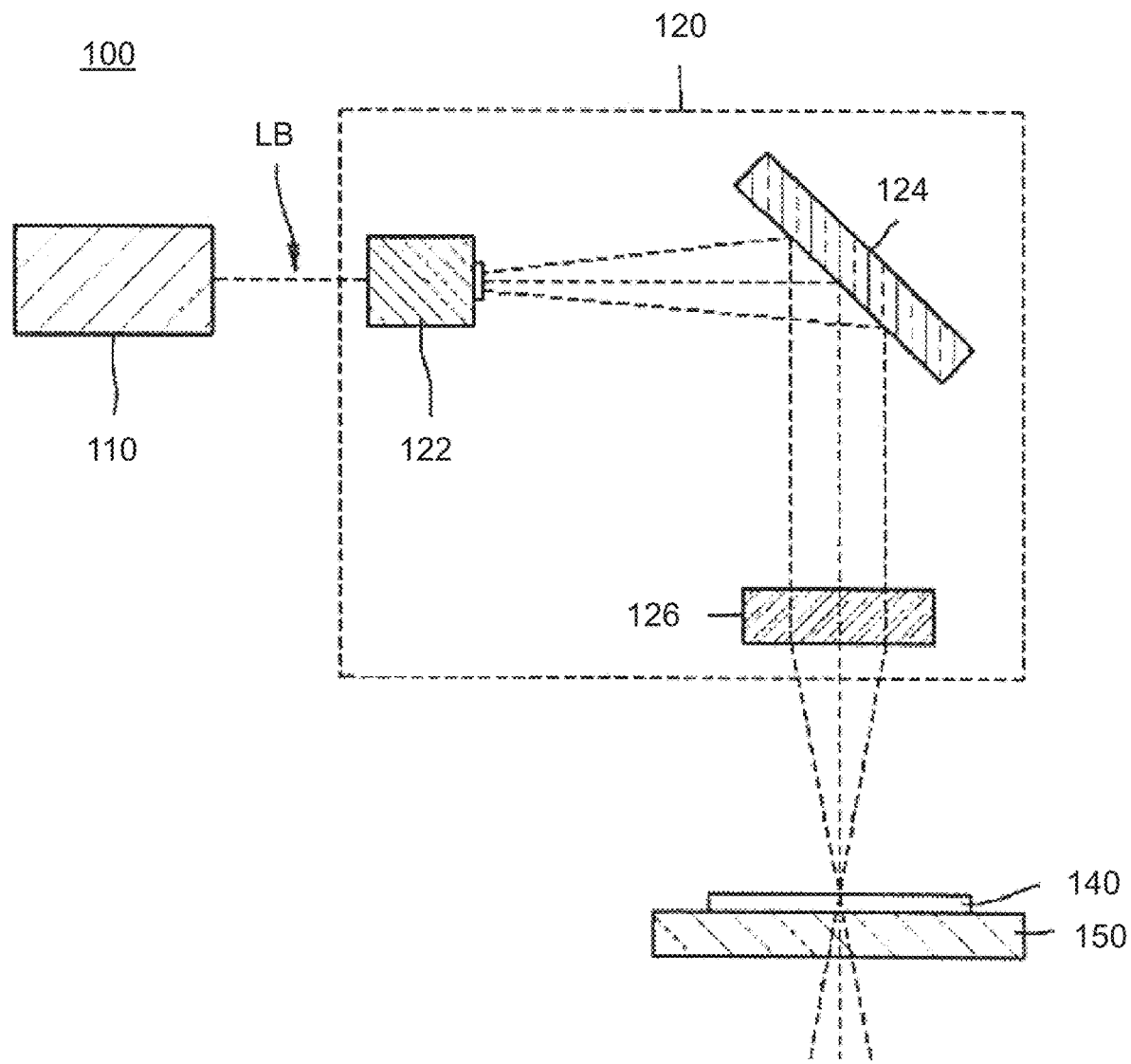
FIG. 3 is a schematic illustration of an excimer laser apparatus including a reflective mirror with a mirror substrate.

Referring now to FIG. 3, a laser annealing apparatus 100 is shown. The apparatus 100 includes a laser beam generator 110 which produces a raw laser beam LB which passes through an optical system 120. The laser beam LB is generally an excimer laser, which is a form of laser that can emit ultraviolet light in wavelengths between 10 nanometers and 400 nanometers (nm). An excimer laser typically uses a combination of a noble gas (argon, krypton, or xenon) and a reactive gas (fluorine or chlorine). Under appropriate conditions of electrical stimulation and high pressure, laser light in the ultraviolet range is created.

The optical system 120 can include other optical components, such as a beam homogenizer or beam expander 122, the reflective mirror 124, and a focusing lens 126. A beam splitter can also be used. One or more of these components may be present, depending on the operation and arrangement of parts within the apparatus. These optical components can be used to divide laser beam LB into a plurality of linear laser beams that are subsequently homogenized and overlapped (converged) to finally form a single linear laser beam having a desired beam width and beam length. The optical system 120 is only shown as being functionally divided in this manner for convenience of explanation. The optical system 120 generally may include any optical element which can homogenize or expand an energy distribution of the laser beam LB.

The mirror 124 of the optical system 120 changes a path of the laser beam generated from the laser beam generation unit 110, in a direction different from the original path of the laser beam LB. As illustrated in FIG. 3, the mirror 124 changes the path of the laser beam LB to a direction perpendicular to the original laser beam path. In other words, the mirror 124 reflects or steers the laser beam in order to project the laser beam onto focusing lens 126, such that the laser beam irradiates an exposed surface of a substrate 140 used in the production of electronic displays. The mirror 124 may be connected to a motor (not shown) and drive system that permits the position of the mirror to be changed relative to the laser beam generator 110.

The focusing lens 126 focuses the divided linear laser beams to form a single linear laser beam. Preferably, the divided linear laser beams are focused on the exposed upper surface of substrate 140. That is, the divided linear laser beams overlap with each other to form a single linear laser beam. A cylindrical lens may be used as focusing lens 126. After the single linear laser beam output from optical system 120 is projected onto the substrate 140, the linear laser beam scans the exposed upper surface of substrate 140 by moving in a direction perpendicular to the lengthwise direction of the linear laser beam with a fixed scan pitch. Alternatively, a stage 150 for holding the substrate 140 may move in a direction opposite to the direction in which the linear laser beams moves. In some embodiments, as a result of irradiating the output laser beam on the exposed surface of substrate 140, an amorphous silicon thin film is annealed to create a polysilicon film. In other words, a polysilicon film is formed by excimer laser annealing ("ELA"). More generally, an amorphous film can be formed from a precursor film through excimer laser annealing.

Figure 4:
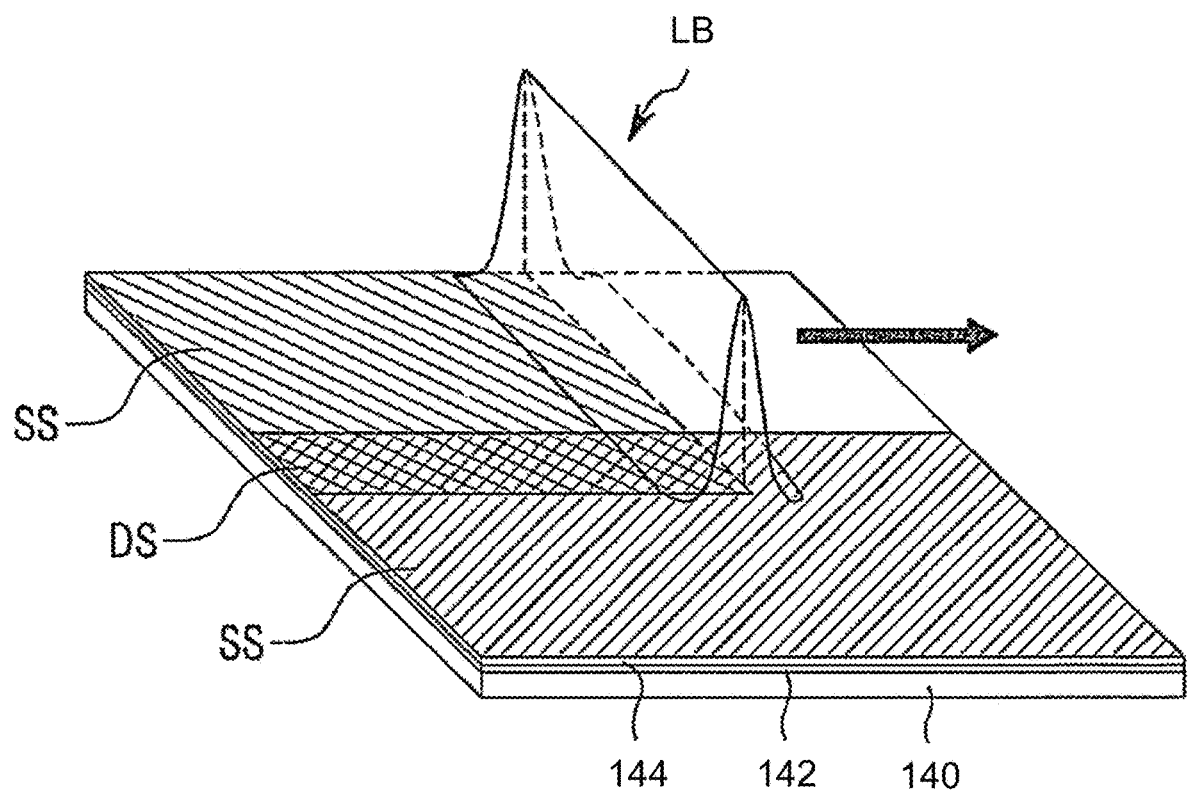
FIG. 4 is a perspective view showing a process of forming a polysilicon film by scanning and irradiating a silicon film with an excimer laser beam.

FIG. 4 shows a perspective view of a process for forming a polysilicon film used in the manufacture of electronic displays, such as an organic light emitting diode display. The polysilicon film is formed with an ELA apparatus, which scans and irradiates an excimer laser beam according to the embodiment of FIG. 3 described above. As shown in FIG. 4, the electronic display includes a substrate main body 140, a buffer layer 142 formed on the substrate main body 140, and a thin amorphous film 144 formed on the buffer layer 142. The substrate main body 140 is formed as an insulating substrate made of glass, quartz, ceramic, plastic, or the like, or as a flexible substrate made of plastic. The buffer layer 142 prevents penetration of unnecessary elements, such as impurity atoms or moisture, and planarizes the surface. However, the buffer layer 142 is not necessarily required, and may be omitted. The amorphous film 144 is generally used to make a semiconductor layer (not shown) included as part of a thin film transistor (not shown). The amorphous film 144 is formed by scanning and irradiating a laser beam LB onto a precursor film (not shown). To produce a silicon film, the amorphous silicon film may undergo a heat treatment prior to laser irradiation in order to form a microcrystalline silicon film.

As illustrated here, in order to polycrystallize a relatively large area, the laser beam LB can be scanned and irradiated twice or more onto the amorphous silicon film. The laser beam LB may be scanned and irradiated so as to be partially overlapped in a width direction due to process tolerance. As illustrated here, the laser beam LB travels in the direction of the arrow to form two single irradiation regions SS and a double irradiation region DS indicating the overlap of laser scanning. The polysilicon film 144 may be divided into a single irradiation region SS that is irradiated once with the laser beam LB and a double irradiation region DS that is irradiated twice with the laser beam LB.

In addition, if the double irradiation region DS receives a laser energy which is different than that of the single irradiation region SS, or if the desired energy distribution profile of the linear laser beam changes (e.g., a thickness of the substrate or the amorphous silicon film changes during annealing), an adjustment device for tuning the shape and adjusting the energy distribution profile of the linear laser beam may be included in the apparatus 100 of FIG. 3. In particular, the apparatus 100 may include a focusing lens adjustment device (not shown) capable of changing a perpendicular distance (i.e., closer to or farther from mirror 124) and rotation angle of focusing lens 126 with respect to substrate 140. Thus, although a desired energy distribution profile of the laser beam may change, the desired energy distribution profile of the laser beam may still be obtained by using a focusing lens adjustment device without having to reset the optical system 120.

The reflective mirrors of the present disclosure can be used in other electronic display forming processes requiring the use of a laser, such as, for example, laser lift off ("LLO") processes. In LLO, a precursor film is deposited upon a temporary substrate, with other processing operations and structures occurring on the opposite surface of the thin film. The laser beam is then directed through the temporary substrate to irradiate the substrate-film interface. This permits removal of the precursor film from the temporary substrate (i.e. the film is "lifted off" of the substrate), and the precursor thin film can be transferred to a permanent substrate having desired properties. The reflective mirrors of the present disclosure can also be used in other systems in addition to ELA or LLO, such as UV lithography, ophthalmic surgery, and dental surgery systems.

Figure 5:
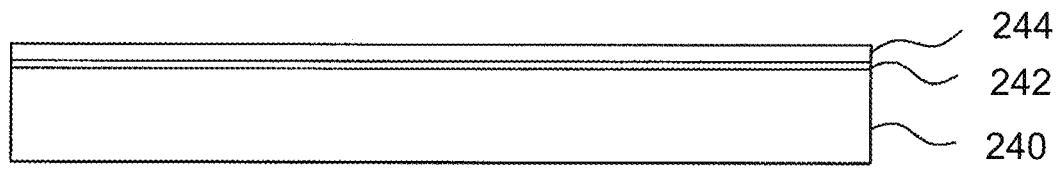
FIG. 5 is a cross-sectional diagram schematically illustrating a lamination from which a thin film display device is separated via a laser lift off process using an excimer laser beam.

Referring to FIG. 5, a lamination is illustrated which is suitable for LLO processing. The lamination of FIG. 5 includes a thin film 244 formed on a temporary substrate 240. The interface between the thin film 244 and the temporary substrate 240 is indicated with reference numeral 242. The interface 242 can simply be a part of the thin film 244, or may be a layer formed from a sacrificial material that can be decomposed by the excimer laser.

The temporary substrate 240 is formed of a material having durability in the high-temperature film forming process of forming the desired thin film 244. The temporary substrate 240 may be formed of a material having greater band gap energy than the band gap energy corresponding to the wavelength of the laser beam, such that the laser beam can be transmitted through the temporary substrate 240. The temporary substrate 240 may be a transparent substrate. The temporary substrate 240 may be formed of any one of sapphire, quartz, glass, magnesium oxide (MgO), a lanthanum aluminate (LaAlO$_3$), fused silica, or zirconia.

To remove the thin film 244, the optical system 120 (including beam homogenizer or expander 122, beryllium mirror 124, and focusing lens 126), shown in FIG. 3 and described above, may be used to focus the laser energy onto the interface 242.

The thin film 244 has a structure used to form the functional unit of a desired electronic display device. The thin film 244 may be formed of an inorganic material, such as a semiconductor or polysilicon, or a metal. Alternatively, the thin film 244 may be formed of amorphous silicon or polysilicon for a display device. More generally, this thin film is referred to as a precursor film.

Figure 6A:
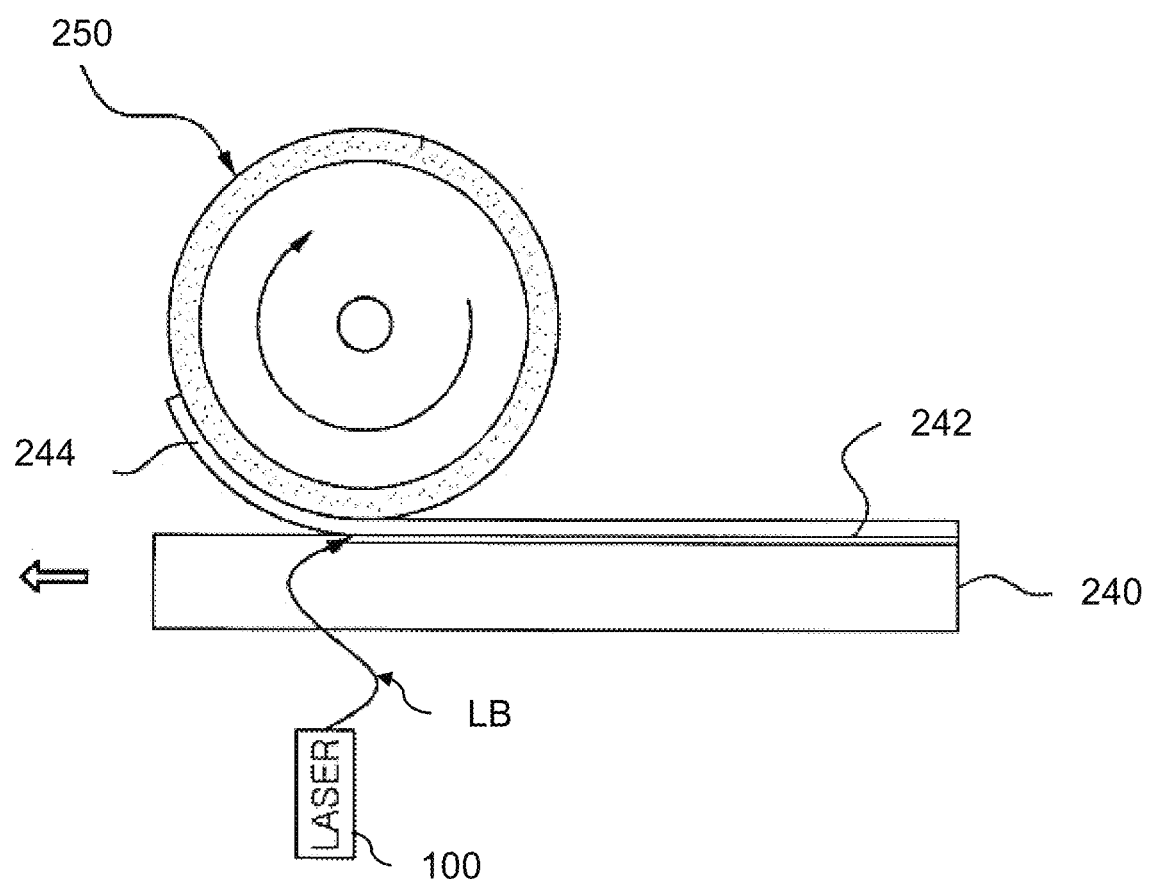
FIG. 6A and FIG. 6B are cross-sectional views illustrating a transferral process for manufacturing a thin film display device from the lamination of FIG. 5.
Figure 6B:
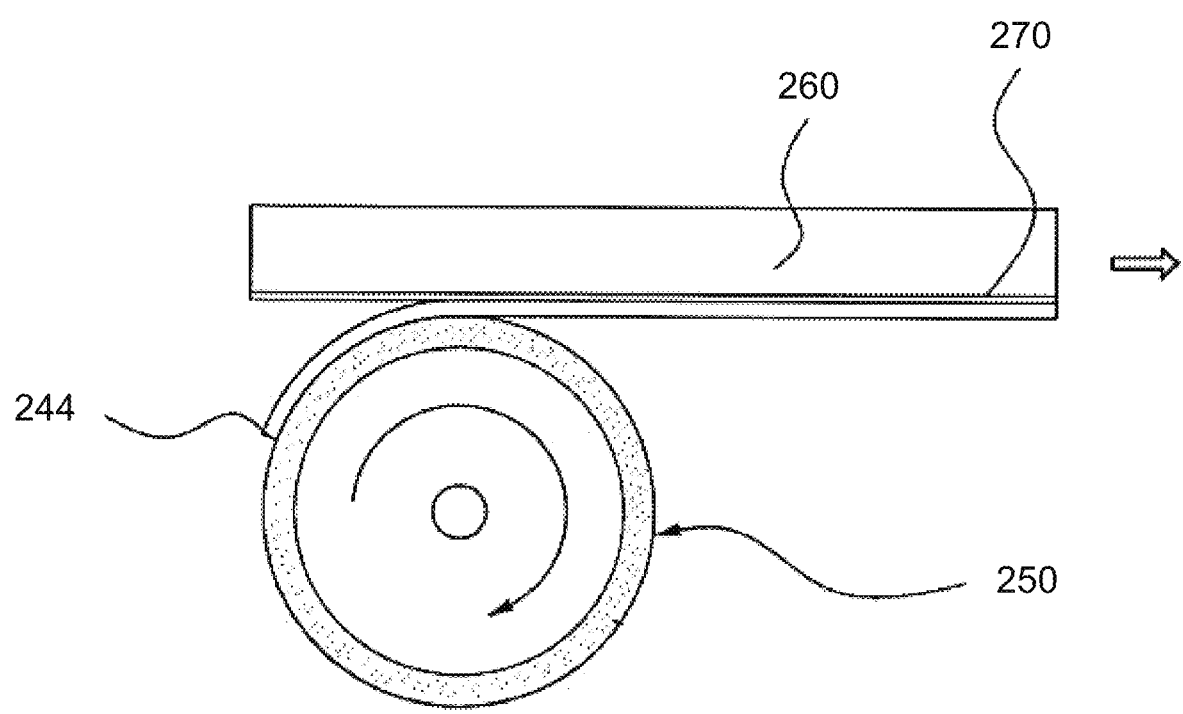

FIG. 6A and FIG. 6B are cross-sectional views illustrating an example of a transferral process for manufacturing a display device that uses LLO. In a first position illustrated in FIG. 6A, the interface 242 is targeted by the laser apparatus 100 so that the thin film 244 is separated from the temporary substrate 240. At the same time, the thin film 244 may make tight contact and be temporarily bonded to the circumferential surface of a transfer roll 250. This process occurs on one side of the transfer roll (here, the bottom).

Concurrently, as shown in FIG. 6B, on the other side of the transfer roll, the permanent substrate 260 is run so that the thin film 244 is transferred from the transfer roll 250, at a second position of the transfer roll, to the surface of the permanent substrate 260. Here, the permanent substrate 260 and the thin film 244 constitute a display device. If desired, an adhesive layer 270 may be additionally coated over the permanent substrate 260 for strengthening the bond between the permanent substrate 260 and the thin film 244.

The use of aluminum MMC or silicon carbide as the mirror substrate in the ultraviolet reflective mirrors of such fabrication apparatuses provides improved performance over previous fused-quartz-based mirrors to meet increased production demands. For example, FIG. 7-10 illustrate optical FoM values (i.e., values used to characterize the performance of various substrate materials relative to one another), including substrates formed of a MMC or silicon carbide and fused-quartz-based substrates, in addition to other substrate materials. In particular, in FIGS. 7-10, bar (1) represents sintered silicon carbide; bar (2) represents an aluminum metal matrix composite material commercially available from Materion under the trade name SupremEX® 640XA; bar (3) represents an aluminum and 30 vol % silicon carbide metal matrix composite material; bar (4) represents fused quartz; bar (5) represents molybdenum; bar (6) represents a 6061 aluminum alloy; and bar (7) represents tungsten.

Figure 7:
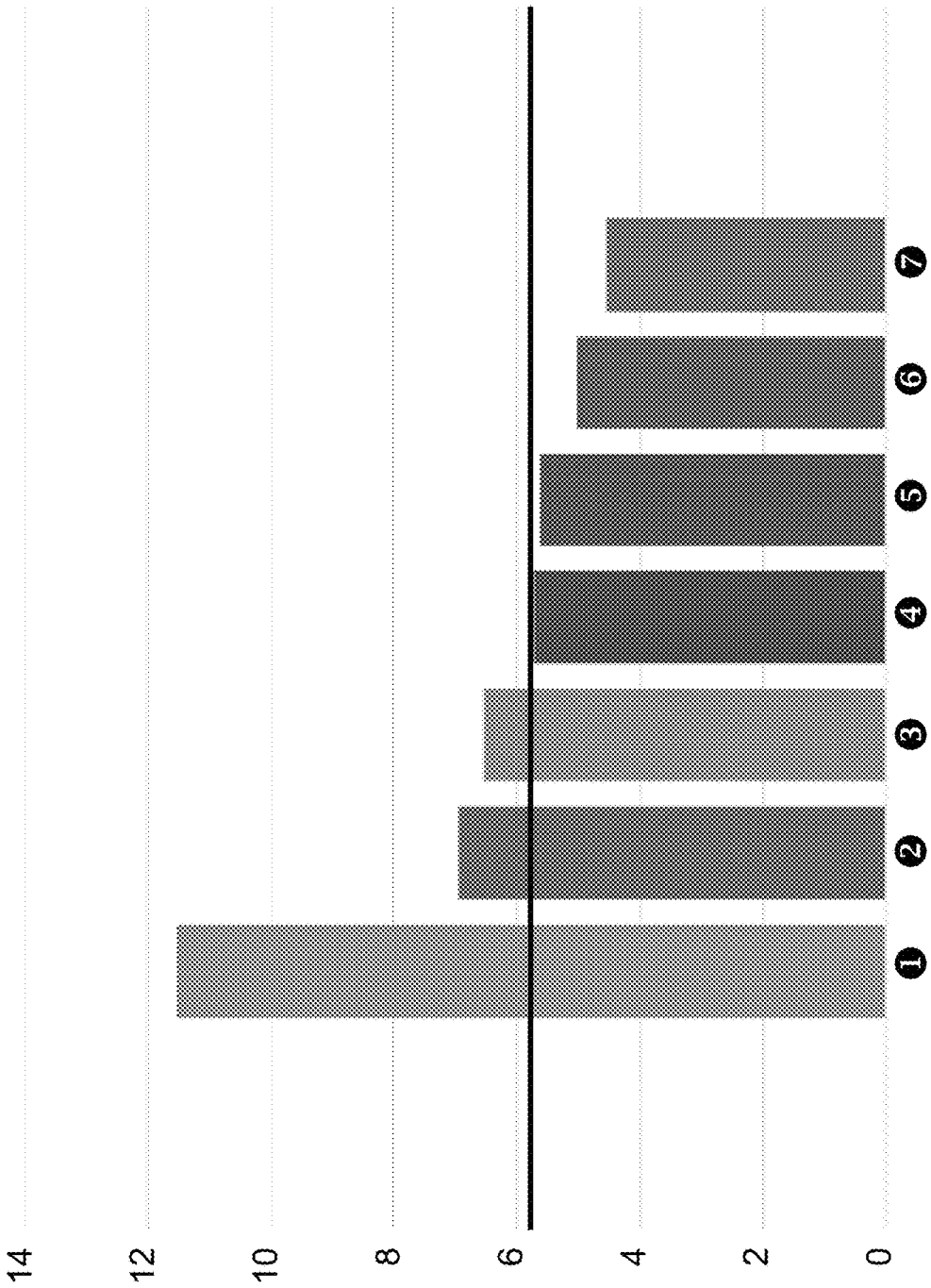
FIG. 7 is a graph illustrating optical Figures of Merit (FoM) resonant frequency values for substrates of various materials in excimer laser system beamline systems. The y-axis represents the FoM values and runs from 0 to 14 in intervals of 2. The x-axis represents the various substrate materials.

FIG. 7 illustrates optical FoM resonant frequency values. In FIG. 7, a higher FoM resonant frequency value is desired for the substrate. Thus, as shown, the desirability of the substrates generally decreases from left to right. The thick horizontal line on the graph of FIG. 7 represents the FoM resonant frequency value of fused quartz (i.e., bar (4)), which is preferably the minimum value to be achieved (i.e., a FoM value of at least 6). As can be seen in FIG. 7, the molybdenum, aluminum 6061, and tungsten substrates did not achieve this preferred FoM value. In comparison, substrates formed from sintered silicon carbide or an aluminum-based MMC did achieve the preferred FoM value. In other words, the sintered silicon carbide and MMC substrates performed much better than the fused-quartz-based substrate, namely with the sintered silicon carbide outperforming all other substrates.

Figure 8:
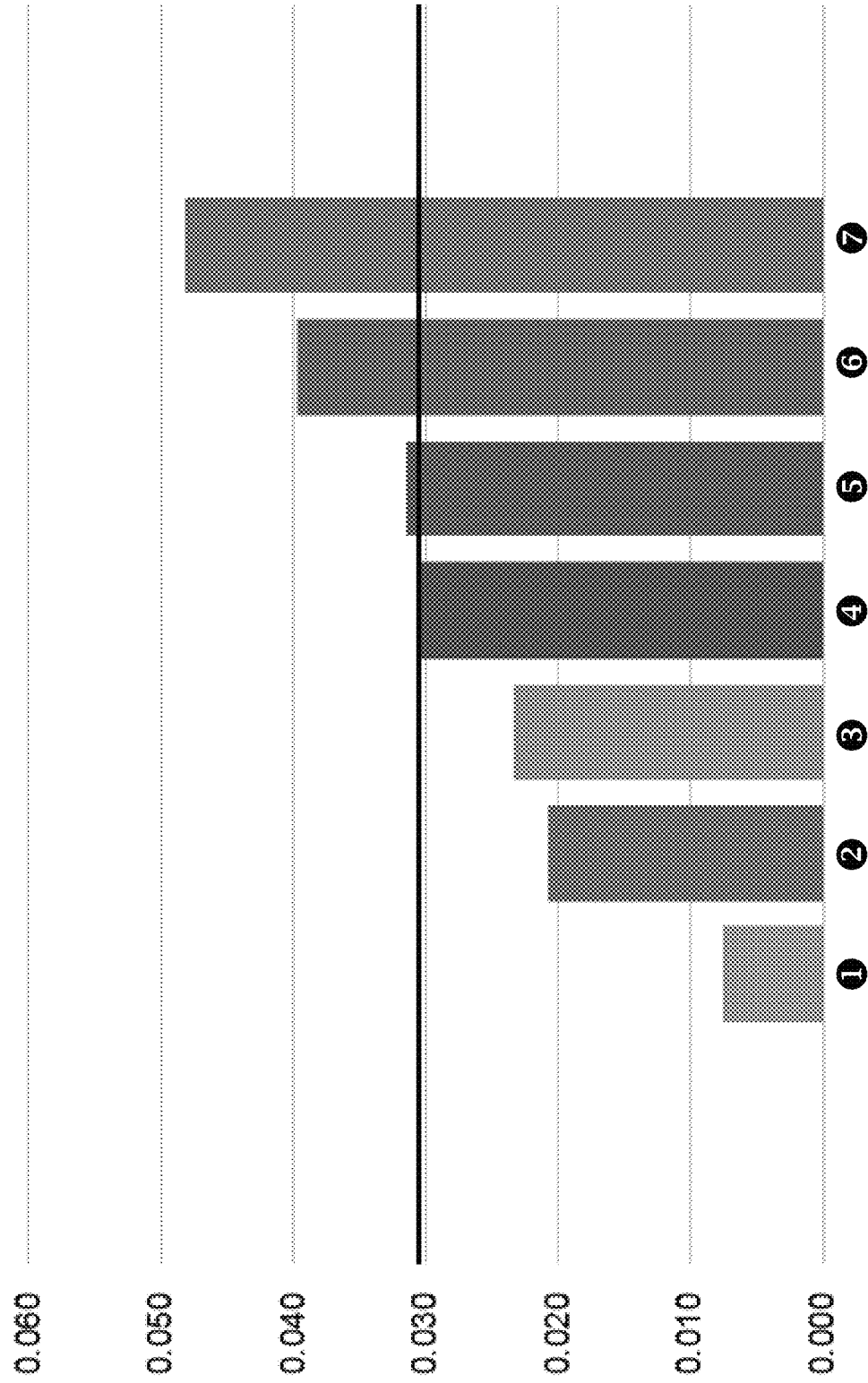
FIG. 8 is a graph illustrating optical Figures of Merit (FoM) self-weight deflection values for substrates of various materials in excimer laser system beamline systems. The y-axis represents the FoM values and runs from 0.000 to 0.060 in intervals of 0.010. The x-axis represents the various substrate materials.

FIG. 8 illustrates optical FoM self-weight deflection values. In FIG. 8, a lower FoM self-weight deflection value is desired for the substrate. Thus, as shown, the desirability of the substrates again generally decreases from left to right. The thick horizontal line on the graph of FIG. 8 represents the FoM self-weight deflection value of fused quartz (i.e., bar (4)), which is preferably the maximum value to be achieved (i.e., a FoM value of less than 0.030). As can be seen in FIG. 8, the molybdenum, aluminum 6061, and tungsten substrates did not achieve this preferred FoM value. In comparison, substrates formed from sintered silicon carbide or an aluminum-based MMC did achieve the preferred FoM value. In other words, the sintered silicon carbide and MMC substrates again performed much better than the fused-quartz-based substrate, namely with the sintered silicon carbide outperforming all other substrates.

Figure 9:
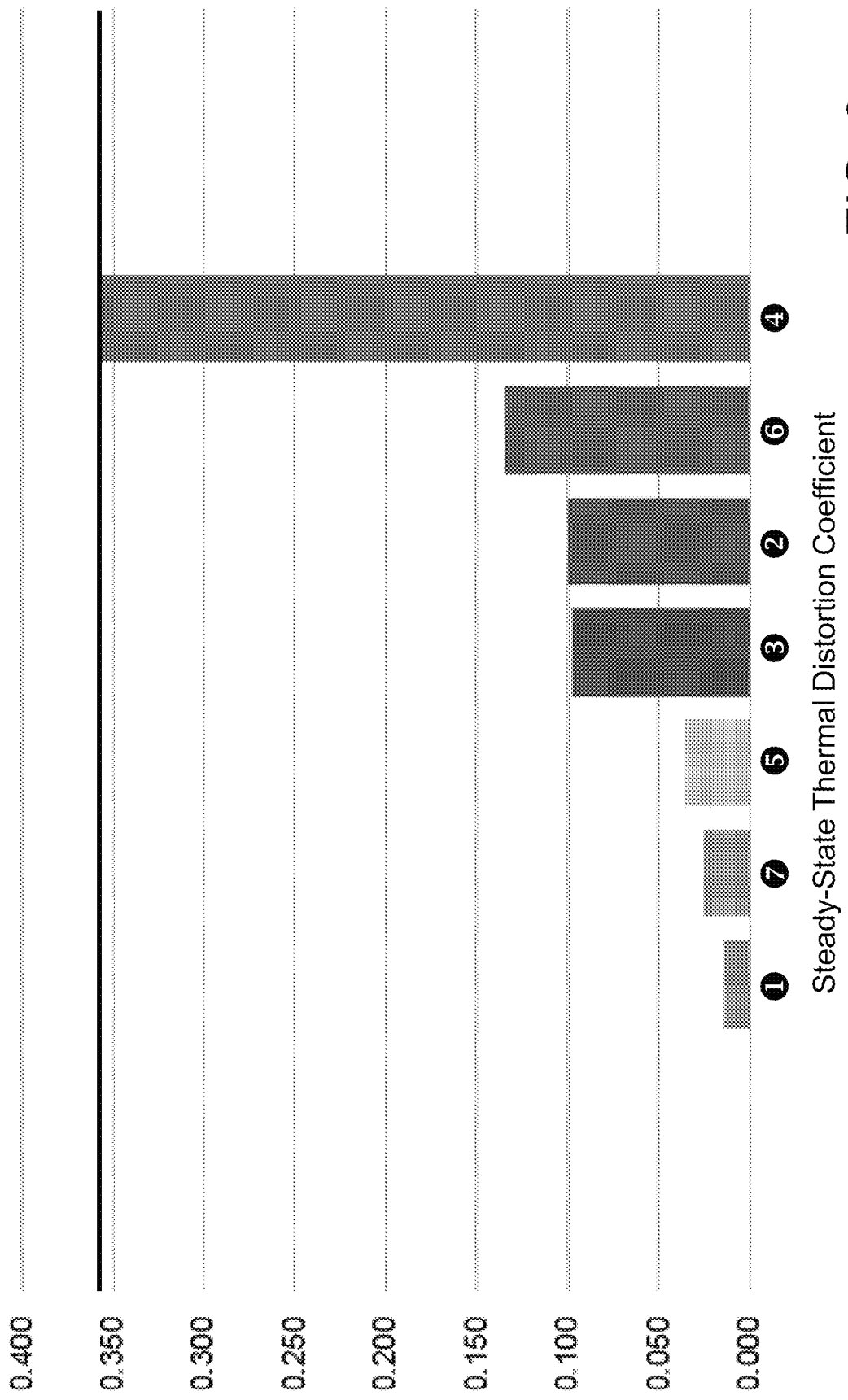
FIG. 9 is a graph illustrating optical Figures of Merit (FoM) steady-state thermal distortion coefficient values for substrates of various materials in excimer laser system beamline systems. The y-axis represents the FoM values and runs from 0.000 to 0.400 in intervals of 0.050. The x-axis represents the various substrate materials.

FIG. 9 illustrates optical FoM steady-state thermal distortion coefficient values. In FIG. 9, a lower FoM steady-state thermal distortion coefficient value is desired for the substrate. Thus, as shown, the desirability of the substrates again generally decreases from left to right. The thick horizontal line on the graph of FIG. 9 represents the FoM steady-state thermal distortion coefficient value of fused quartz (i.e., bar (4)), which is preferably the maximum value to be achieved (i.e., a FoM value of less than 0.350). As can be seen in FIG. 9, all of the other substrates achieved this preferred FoM value. In other words, the sintered silicon carbide and MMC substrates again performed much better than the fused-quartz-based substrate, namely with the sintered silicon carbide outperforming all other substrates.

Figure 10:
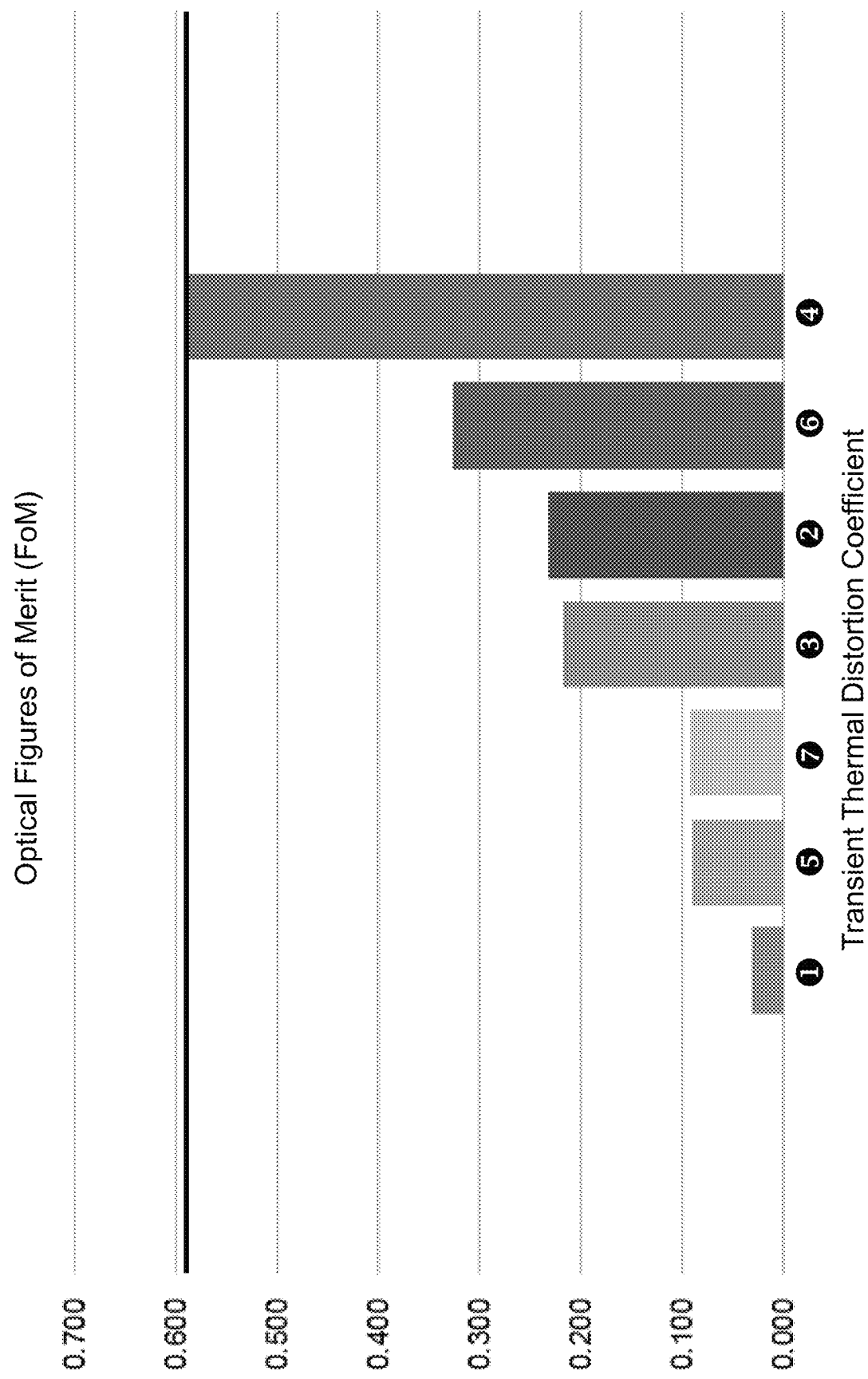
FIG. 10 is a graph illustrating optical Figures of Merit (FoM) transient thermal distortion coefficient values for substrates of various materials in excimer laser system beamline systems. The y-axis represents the FoM values and runs from 0.000 to 0.700 in intervals of 0.100. The x-axis represents the various substrate materials.

Finally, FIG. 10 illustrates optical FoM transient thermal distortion coefficient values. In FIG. 10, a lower FoM transient thermal distortion coefficient value is desired for the substrate. Thus, as shown, the desirability of the substrates again generally decreases from left to right. The thick horizontal line on the graph of FIG. 10 represents the FoM transient thermal distortion coefficient value of fused quartz (i.e., bar (4)), which is preferably the maximum value to be achieved (i.e., a FoM value of less than 0.600). As can be seen in FIG. 10, all of the other substrates achieved this preferred FoM value. In other words, the sintered silicon carbide and MMC substrates again performed much better than the fused-quartz-based substrate, namely with the sintered silicon carbide outperforming all other substrates.

As such, the substrates of the present disclosure are preferably made of a material having: (i) an optical FoM resonant frequency value of at least 6 relative to a fused-quartz substrate; (ii) an optical FoM self-weight deflection value of less than 0.030 relative to a fused-quartz substrate; (iii) an optical FoM steady-state thermal distortion coefficient value of less than 0.350 relative to a fused-quartz substrate; and (iv) an optical FoM transient thermal distortion coefficient value of less than 0.600 relative to a fused-quartz substrate.

The use of the disclosed beryllium-containing materials for the substrate in the ultraviolet reflective mirrors of such fabrication apparatuses provides improved performance over previous quartz-based mirrors to meet increased production demands. For example, beryllium's ability to dissipate heat faster than quartz, in addition to beryllium's higher stiffness, allows an increase in the rastering speed of lasers utilizing mirrors of the present disclosure, without impacting resolution. Accordingly, throughput can be increased, larger displays can be produced without damage which might otherwise occur in quartz mirrors due to prolonged thermal stress inherent in the production of larger displays, and downtime for maintenance of production equipment can be lowered.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. An apparatus comprising:
an ultraviolet laser; and
at least one reflective mirror adapted to reflect a laser beam generated from the ultraviolet laser;
wherein the at least one reflective mirror comprises a mirror substrate,
wherein the mirror substrate is made from silicon carbide or an aluminum metal matrix composite, and has:
(i) an optical Figure of Merit (FoM) resonant frequency value of at least 6 relative to a fused-quartz substrate;
(ii) an optical FoM self-weight deflection value of less than 0.030 relative to a fused-quartz substrate;
(iii) an optical FoM steady-state thermal distortion coefficient value of less than 0.350 relative to a fused-quartz substrate; and
(iv) an optical FoM transient thermal distortion coefficient value of less than 0.600 relative to a fused-quartz substrate.

2. The apparatus of claim 1, wherein the mirror substrate is made of an aluminum metal matrix composite of an aluminum alloy and one or more reinforcing particles.

3. The apparatus of claim 2, wherein the one or more reinforcing particles includes at least one ceramic material selected from the group consisting of carbides, oxides, silicides, borides, and nitrides.

4. The apparatus of claim 2, wherein the one or more reinforcing particles includes silicon carbide.

5. The apparatus of claim 2, wherein the metal matrix composite comprises a 6061, 6063, 6082, 2009, 2618 or 2124 aluminum alloy reinforced with from about 15 vol % to about 40 vol % of silicon carbide.

6. The apparatus of claim 1, an ultraviolet reflective coating deposited upon the mirror substrate, wherein the ultraviolet reflective coating is a layer made from a combination of hafnium dioxide ($HfO_2$) and silicon dioxide ($SiO_2$), or wherein the ultraviolet reflective coating is formed from alternating layers of (i) a coating formed from aluminum and hafnium oxide and (ii) a coating formed from aluminum and silicon dioxide.

7. A method of making an electronic part, comprising:
receiving an ultraviolet laser apparatus comprising an ultraviolet laser and at least one reflective mirror comprising a mirror substrate;
generating a laser beam with the ultraviolet laser; and
reflecting the laser beam with the at least one reflective mirror toward a precursor film to produce the electronic part;
wherein the mirror substrate is made from silicon carbide or an aluminum metal matrix composite, and has:
(i) an optical Figure of Merit (FoM) resonant frequency value of at least 6 relative to a fused-quartz substrate;
(ii) an optical FoM self-weight deflection value of less than 0.030 relative to a fused-quartz substrate;
(iii) an optical FoM steady-state thermal distortion coefficient value of less than 0.350 relative to a fused-quartz substrate; and
(iv) an optical FoM transient thermal distortion coefficient value of less than 0.600 relative to a fused-quartz substrate.

8. The method of claim 7, wherein the precursor film is an amorphous film.

9. The method of claim 8, wherein the laser beam is reflected directly upon the precursor film to induce crystallization of the amorphous film.

10. The method of claim 8, wherein the precursor film is mounted upon a temporary substrate, and the laser beam is reflected through the temporary substrate onto the precursor film to separate the precursor film from the temporary substrate.

11. The method of claim 7, wherein the electronic part is used in an organic light-emitting diode (OLED) display or a low-temperature polycrystalline silicon liquid crystal display (LTPS LCD).

12. An ultraviolet reflective mirror, comprising:
a mirror substrate; and
an ultraviolet reflective coating deposited upon a front surface of the mirror substrate;
wherein the mirror substrate is made from silicon carbide or an aluminum metal matrix composite, and has:

(i) an optical Figure of Merit (FoM) resonant frequency value of at least 6 relative to a fused-quartz substrate;
(ii) an optical FoM self-weight deflection value of less than 0.030 relative to a fused-quartz substrate;
(iii) an optical FoM steady-state thermal distortion coefficient value of less than 0.350 relative to a fused-quartz substrate; and
(iv) an optical FoM transient thermal distortion coefficient value of less than 0.600 relative to a fused-quartz substrate.

13. The mirror of claim 12, wherein a rear surface of the mirror substrate includes ribs for strengthening the mirror.

* * * * *